(12) United States Patent
Holmberg et al.

(10) Patent No.: US 9,582,001 B1
(45) Date of Patent: Feb. 28, 2017

(54) MOTOR SYSTEM FOR VEHICLE STEERING AND LOCOMOTION

(71) Applicant: X Development LLC, Mountain View, CA (US)

(72) Inventors: Robert Andre Holmberg, Mountain View, CA (US); John William Zevenbergen, Saratoga, CA (US); Mark Fischer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/876,923

(22) Filed: Oct. 7, 2015

(51) Int. Cl.
| | |
|---|---|
| *B62D 7/02* | (2006.01) |
| *G05D 1/00* | (2006.01) |
| *B60K 7/00* | (2006.01) |
| *B62D 5/04* | (2006.01) |
| *B62D 6/00* | (2006.01) |
| *B62D 63/04* | (2006.01) |
| *B66C 13/22* | (2006.01) |
| *B66F 9/06* | (2006.01) |
| *B66F 9/075* | (2006.01) |

(52) U.S. Cl.
CPC ......... *G05D 1/0088* (2013.01); *B60K 7/0007* (2013.01); *B62D 5/0403* (2013.01); *B62D 5/046* (2013.01); *B62D 6/00* (2013.01); *B62D 63/04* (2013.01); *B66C 13/22* (2013.01); *B66F 9/063* (2013.01); *B66F 9/07568* (2013.01); *B66F 9/07572* (2013.01); *B60K 2007/0061* (2013.01)

(58) Field of Classification Search
USPC ......... 301/6.5; 180/21, 234, 240; 701/22, 41
See application file for complete search history.

(56) References Cited

U.S. PATENT DOCUMENTS

| | | | |
|---|---|---|---|
| 5,128,598 | A | 7/1992 | Avitan |
| 6,491,127 | B1 * | 12/2002 | Holmberg ............ B60K 7/0007 180/21 |

(Continued)

FOREIGN PATENT DOCUMENTS

| | | |
|---|---|---|
| JP | 06-213605 A | 8/1994 |
| JP | 07-228246 A | 8/1995 |

OTHER PUBLICATIONS

International Search Report for corresponding PCT application No. PCT/US2016/054133, dated Jan. 2, 2017.

*Primary Examiner* — Thomas Tarcza
*Assistant Examiner* — Richard Goldman
(74) *Attorney, Agent, or Firm* — McDonnell Boehnen Hulbert & Berghoff LLP

(57) ABSTRACT

The present disclosure provides an example motor system. The motor system includes a steering motor with a first rotor positioned within a first stator. The steering motor is configured to rotate the first rotor about a steering axis. The motor system also includes a traction motor including a second stator positioned within a second rotor. The second rotor includes a traction surface defining a wheel. The traction motor is configured to rotate the second rotor about a rolling axis, and the traction motor is positioned within an opening in the first rotor. The motor system also includes an axle positioned coaxial to the second rotor and coupled to the first rotor such that the traction motor rotates about the steering axis as the steering motor rotates the first rotor about the steering axis.

20 Claims, 8 Drawing Sheets

(56) References Cited

U.S. PATENT DOCUMENTS

| | | | | |
|---|---|---|---|---|
| 8,083,013 B2* | 12/2011 | Bewley | ............... | B62D 37/00 |
| | | | | 180/199 |
| 8,447,448 B2* | 5/2013 | Scheuerman | ........ | G05D 1/0242 |
| | | | | 180/168 |
| 9,073,423 B2* | 7/2015 | Swasey | .............. | B60K 17/30 |
| 2009/0265059 A1* | 10/2009 | Medwin | ............. | B66F 9/0755 |
| | | | | 701/31.4 |
| 2010/0168998 A1* | 7/2010 | Matsunaga | .......... | B60W 30/10 |
| | | | | 701/532 |
| 2010/0222959 A1* | 9/2010 | Murata | ............ | B60G 17/0195 |
| | | | | 701/31.4 |
| 2010/0222960 A1* | 9/2010 | Oida | ............... | B60G 17/0195 |
| | | | | 701/31.4 |
| 2010/0222965 A1* | 9/2010 | Kimura | ............ | B60W 30/025 |
| | | | | 701/41 |
| 2011/0106352 A1* | 5/2011 | Scheuerman | ........ | G05D 1/0242 |
| | | | | 701/22 |
| 2011/0106362 A1 | 5/2011 | Seitz | | |
| 2012/0006609 A1* | 1/2012 | Doan | ............... | B60K 17/303 |
| | | | | 180/218 |
| 2012/0312616 A1 | 12/2012 | Falesiedi | | |
| 2013/0197762 A1* | 8/2013 | Schuberth | ........... | B62D 5/008 |
| | | | | 701/42 |

\* cited by examiner

MOTOR SYSTEM FOR VEHICLE STEERING AND LOCOMOTION

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

An autonomous guided vehicle (AGV) may be used to transport individual packages, cases, or totes from one location to another within a warehouse. Such an AGV may be a relatively small, mobile device with a plurality of wheels. Accordingly, such a device may include a plurality of motor systems configured to rotate the plurality of wheels to perform such traversal. For example, a traction motor may be configured to rotate a wheel about a rolling axis of the wheel to cause the wheel to move forward/backward. Additionally, for example, a steering motor may be configured to rotate the wheel about a steering axis of the wheel to adjust an orientation (e.g., steering angle) of the wheel. However, there may be limited space in the AGV for both the steering motor and the traction motor. Therefore, a low profile design of such motor systems may be advantageous. In one example, such a low profile design may include a traction motor positioned within a steering motor. In such an example, the rotor of the traction motor may include a wheel surface, thereby encapsulating the traction motor and wheel all in one unit. Thus, the height of the motor system will not exceed the height of the traction motor.

In one example, a motor system is provided. The motor system may include a steering motor with a first rotor positioned within a first stator. The steering motor may be configured to rotate the first rotor about a steering axis. The motor system may also include a traction motor including a second stator positioned within a second rotor. The second rotor may include a traction surface defining a wheel. The traction motor may be configured to rotate the second rotor about a rolling axis, and the traction motor may be positioned within an opening in the first rotor. The motor system may also include an axle positioned coaxial to the second rotor and coupled to the first rotor such that the traction motor rotates about the steering axis as the steering motor rotates the first rotor about the steering axis.

In another example, a device is provided. The device may include a frame including a top surface and a bottom surface, and a plurality of wheels coupled to the bottom surface of the frame. Each of the plurality of wheels may include a steering motor including a first rotor positioned within a first stator, wherein the steering motor is configured to rotate the first rotor about a steering axis, and wherein the first stator is coupled to the bottom surface of the frame. Each of the plurality of wheels may also include a traction motor including a second stator positioned within a second rotor, wherein the second rotor includes a traction surface, wherein the traction motor is configured to rotate the second rotor about a rolling axis, and wherein the traction motor is positioned within an opening in the first rotor. Each of the plurality of wheels may also include an axle positioned coaxial to the second rotor and coupled to the first rotor such that the traction motor rotates about the steering axis as the steering motor rotates the first rotor about the steering axis. The device may also include a controller configured to operate the steering motor and the traction motor of each of the plurality of wheels in order to cause the device to navigate within an environment.

In yet another example, a method is provided that includes determining, by a control system of a device, a target position of the device. The method may also include operating, by the control system of the device, a plurality of wheels of the device to cause the device to navigate to the target position. Each of the plurality of wheels may include a steering motor including a first rotor positioned within a first stator, wherein the steering motor is configured to rotate the first rotor about a steering axis. In addition, each of the plurality of wheels may also include a traction motor including a second stator positioned within a second rotor, wherein the second rotor includes a traction surface, wherein the traction motor is configured to rotate the second rotor about a rolling axis, and wherein the traction motor is positioned within an opening in the first rotor. Further, each of the plurality of wheels may also include an axle positioned coaxial to the second rotor and coupled to the first rotor such that the traction motor rotates about the steering axis as the steering motor rotates the first rotor about the steering axis.

These as well as other aspects, advantages, and alternatives, will become apparent to those of ordinary skill in the art by reading the following detailed description, with reference where appropriate to the accompanying figures.

DETAILED DESCRIPTION

Figure 1A:
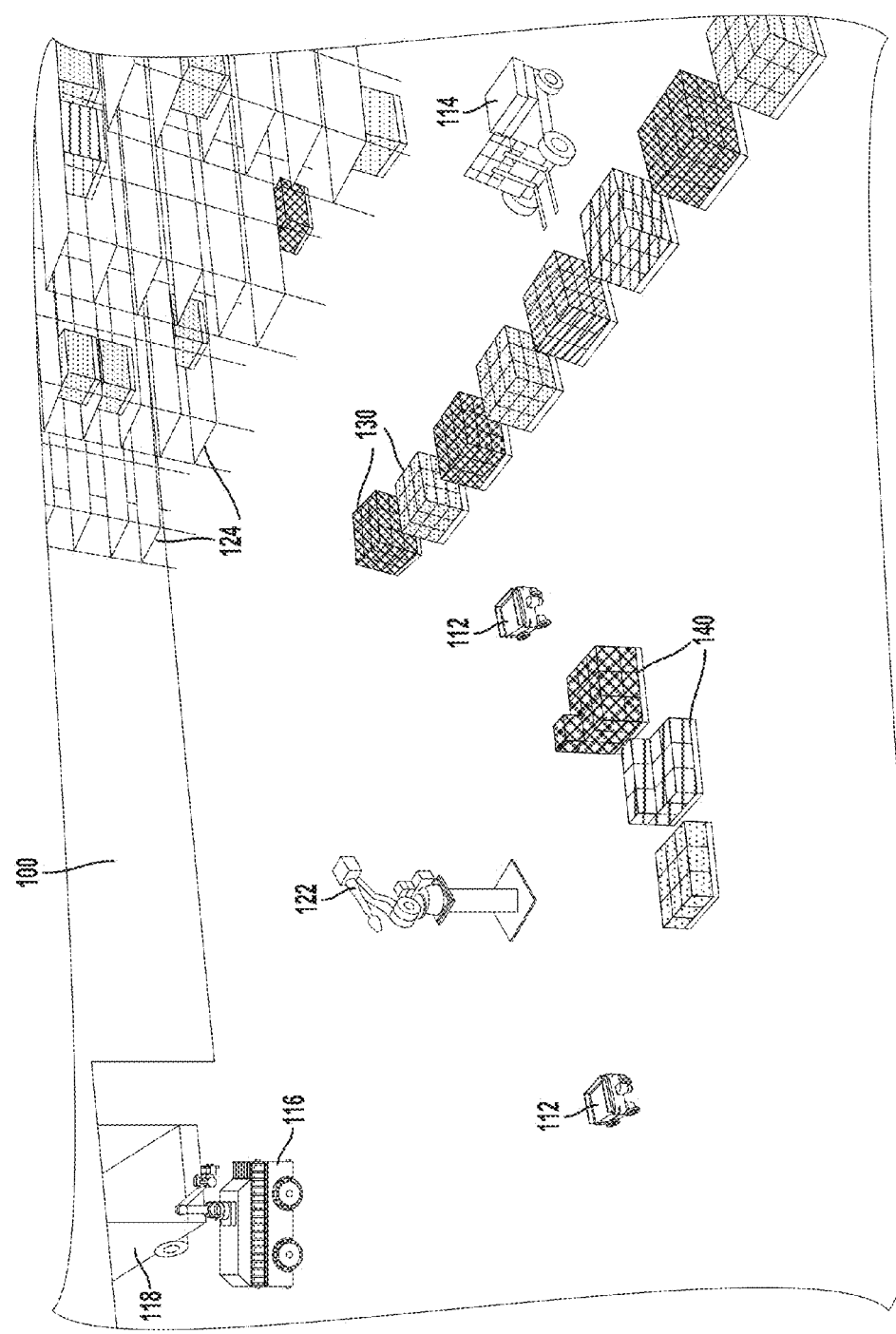
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Mobile manipulator systems may be utilized in various industrial and service applications such as assembly, inspection, and work in hazardous environments. For example, a mobile robotic platform may include sensors, such as a camera, and manipulators, such as a robotic arm. Additionally, the robotic platform may be remotely or autonomously operated to perform various tasks. Various systems may be employed to control motion of such robotic platforms. For example, the robotic platform may be supported and moved by wheels. A control system may control the wheels to move the robotic platform from one location to another, and may control on-board manipulators to perform the various tasks.

Within examples, a device is provided that includes a plurality of wheels coupled to a frame in a given arrangement. The device, for example, may be a robotic manipulator platform or any other vehicle/apparatus having the frame supported by the plurality of wheels. In some scenarios, the device may be configured to traverse the frame from one location to another. In one particular example, an autonomous guided vehicle (AGV) may be used to transport individual packages, cases, or totes from one location to another within a warehouse. Such an AGV may be a relatively small, mobile device with a plurality of wheels. Accordingly, such a device may include a plurality of motor systems configured to rotate the plurality of wheels to perform such traversal. For example, a fraction motor may be configured to rotate a wheel about a rolling axis of the wheel to cause the wheel to move forward/backward. Additionally, for example, a steering motor may be configured to rotate the wheel about a steering axis of the wheel to adjust an orientation (e.g., steering angle) of the wheel.

In one example, a motor system may include a traction motor and a steering motor. The traction motor may be positioned within a wheel surface, thereby essentially encapsulating the traction motor and wheel all in one unit. To make the design low profile, the motor system may include a rotor of the steering motor as well as an outer ring comprising a stator of the steering motor. The traction motor may be positioned within an opening of the rotor of the steering motor. The motor system may further include an axle positioned coaxial to the traction motor and physically coupled to the rotor of the steering motor. In this manner, the design may include the traction motor and steering motor, and the stator of the steering motor may be coupled to a frame of the AGV. Accordingly, a steering motor with a large diameter could be made low profile but still have all of the torque necessary to steer the AGV.

It should be understood that the above examples are provided for illustrative purposes, and should not be construed as limiting. As such, the implementations herein may additionally or alternatively includes other features or includes fewer features, without departing from the scope of the invention.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an AGV 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
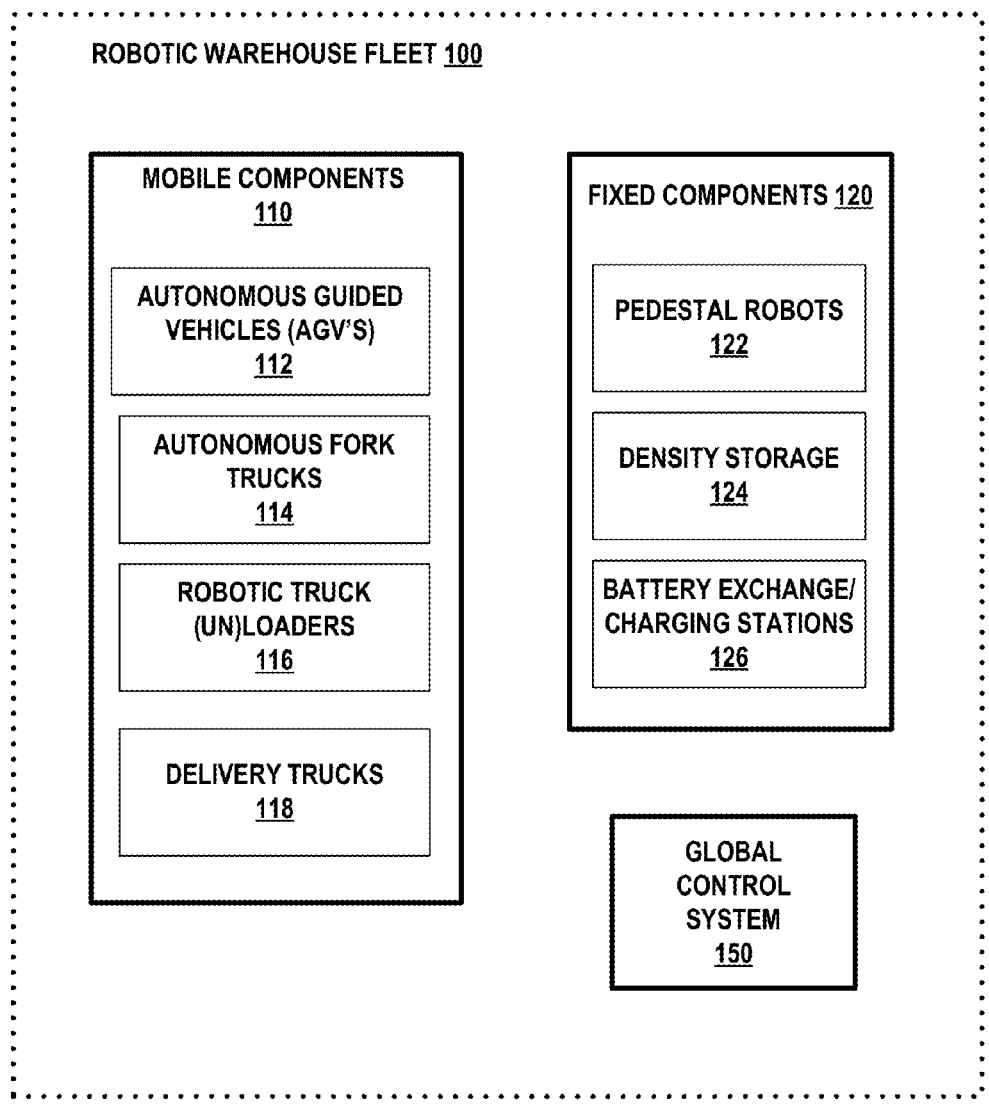
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

Figure 2:
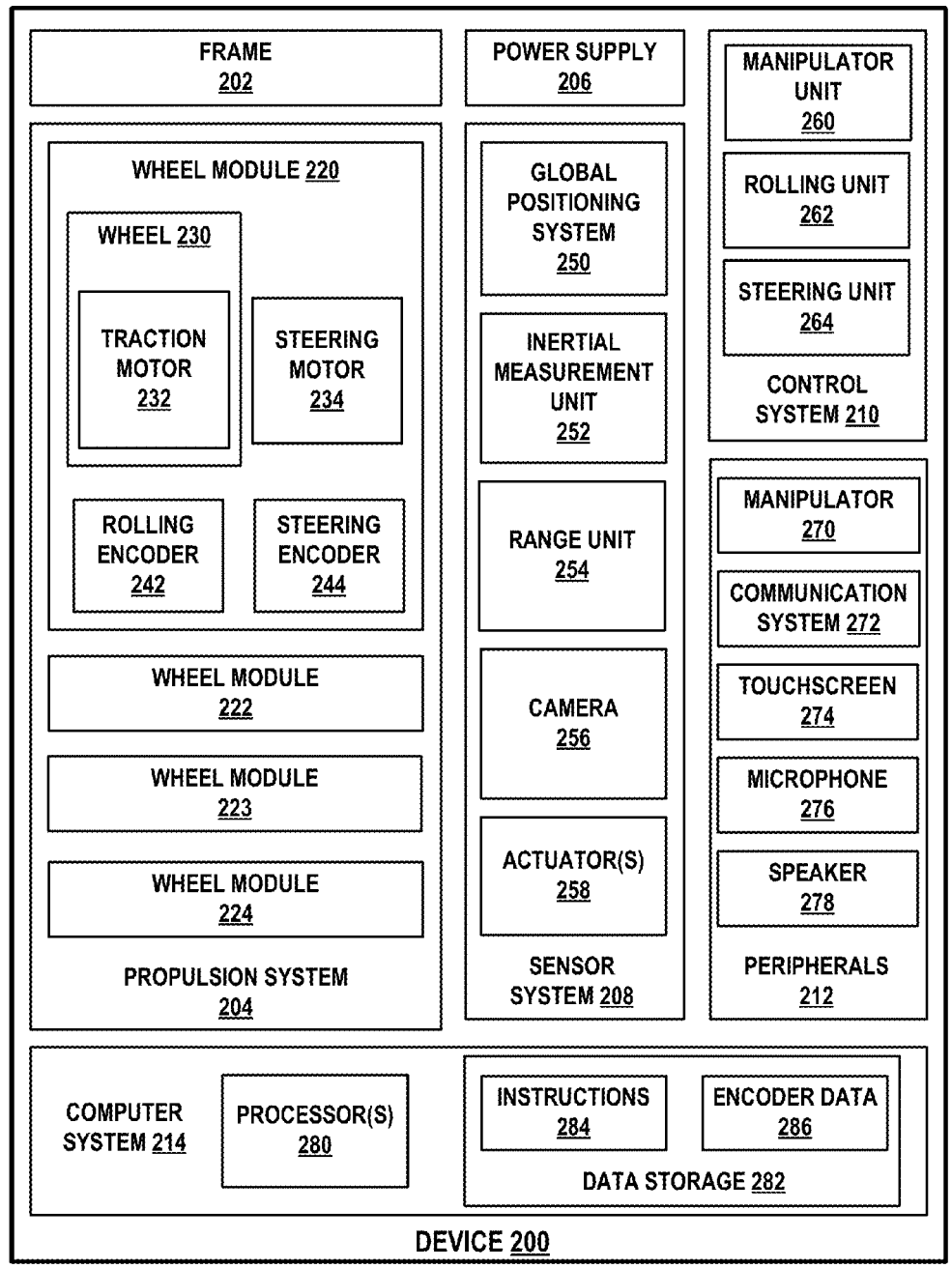
FIG. 2 is a simplified block diagram of a device, according to an example embodiment.

FIG. 2 is a simplified block diagram of a device 200 that may be included within a robotic warehouse fleet. Other devices which vary in form from those illustrated here as well as other types of devices may also be included. As shown, the device 200 includes a frame 202, a propulsion system 204, a power supply 206, a sensor system 208, a control system 210, peripherals 212, and a computer system 214. In other embodiments, the device 200 may include more, fewer, or different systems, and each system may include more, fewer, or different components. Additionally, the systems and components shown may be combined or divided in any number of ways.

The frame 202 may be configured to support the various components of the device 200. For example, the frame 202 may include aluminum, titanium, other metal/metal-alloy, plastic, composite, wood, or any other solid material having shape and material characteristics to support the components of the device 200.

The propulsion system 204 may be configured to provide powered motion for the device 200. As illustrated in FIG. 2, the propulsion system 204 includes a plurality of wheel modules 220, 222, 223, and 224. The plurality of wheel modules may be coupled to the frame 202 in a given arrangement. For example, the plurality of wheel modules may be arranged symmetrically, asymmetrically, or in any other arrangement according to a particular configuration of the device 200. Although FIG. 2 shows that the propulsion system 204 includes four wheel modules, in other embodiments, the propulsion system 204 may include a different number of wheel modules. For example, the propulsion system 204 may include one, two, three, five, or more wheel modules.

The wheel module 220 includes a traction motor 232 with an outer surface defining a wheel 230, a steering motor 234, a rolling encoder 242, and a steering encoder 244.

The wheel 230 may include one or more solid materials positioned on a rotor of the traction motor. Such materials may be suitable for performing the function of the wheel 230 such as plastic, rubber, metal, metal compound, etc. By way of example, wheel 230 may be configured to roll along a straight line path, or mounted on a pivot (e.g., swivel, etc.) such that the wheel 230 may align with a direction of travel. Additionally, in some examples, the wheel 230 may include an energy-absorbing material (e.g., rubber, etc.) to facilitate operation and/or maintenance of the wheel 230. For example, the wheel 230 may include a tire coupled to the rotor of the traction motor 232.

The traction motor 232 may be configured to rotate the wheel 230 about a rolling axis of the wheel 230. Thus, for example, the traction motor 232 may cause the wheel 230 to move forward or backward. The steering motor 234 may be configured to rotate the wheel 230 about a steering axis of the wheel 230. Thus, for example, the steering motor 234 may adjust a steering angle or direction of the wheel 230. The traction motor 232 and the steering motor 234 may include any combination of motors such as an electric motor, a brushless direct current motor, a steam motor, a sterling motor, a combustion motor, or any other motor. In some examples, the traction motor 232 and/or the steering motor 234 may include multiple types of motors. For example, a gas-electric hybrid device may include a gasoline engine and an electric engine that are intermittently activated as the traction motor 232 (or the steering motor 234). Other examples are possible as well.

A rolling encoder 242 may be coupled to the fraction motor 232 and configured to provide data indicative of motion and/or orientation of the traction motor 232. Similarly, a steering encoder 244 may be coupled to the steering motor 234 and configured to provide data indicative of motion and/or orientation of the steering motor 234. For example, the rolling encoder 242 (and/or the steering encoder 244) may include a rotary encoder, a shaft encoder, or any other electro-mechanical device configured to convert an angular position/motion of a shaft of the traction motor 232 (and/or the steering encoder 244) to an analog or digital signal (e.g., the data, etc.). Various implementations are possible for the rolling encoder 242 and/or the steering encoder 244 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the rolling encoder 242 and/or the steering encoder 244 may indicate a change in a position (e.g., orientation) of, respectively, the traction motor 232 and/or the steering motor 234. Further, for example, the rolling encoder 242 and/or the steering encoder 244 may provide a signal (e.g., index pulse, etc.) indicative of the traction motor 232 and/or the steering motor 234 being at a particular orientation. Further, in some examples, the data provided by the rolling encoder 242 and/or the steering encoder 244 may be processed by the device 200 to determine speeds of the traction motor 232 and/or the steering motor 234. For example, a time measurement may be obtained by the device 200 in addition to the data from the rolling encoder 242 and/or the steering encoder 244 to determine the speeds of the traction motor 232 and/or the steering motor 234.

Accordingly, in some examples, the rolling encoder 242 and/or the steering encoder 244 may include an incremental encoder configured to provide the data indicative of a change in the orientation of the traction motor 232 and/or the steering motor 234. In these examples, the device 200 may cause the traction motor 232 and/or the steering motor 234 to rotate the wheel 230, respectively, about the rolling axis and/or steering axis of the wheel 230 until the signal (e.g., index pulse, etc.) of the rolling encoder 242 and/or the steering encoder 244 is detected to determine the particular orientations of the traction motor 232 and/or the steering motor 234.

Additionally or alternatively, in some examples, the rolling encoder 242 and/or the steering encoder 244 may include an absolute encoder configured to provide the data. The absolute encoder, for example, may be configured to detect motion/change in orientations of the traction motor 232 and/or the steering motor 234 even if the absolute encoder is not provided with power. In these examples, the rolling encoder 242 and/or the steering encoder 244 may provide the data indicative of the orientations of the traction motor 232 and/or the steering motor 234 without the device 200 rotating a given wheel until the signal (e.g., index pulse) is received from the rolling encoder 242 and/or the steering encoder 244. Moreover, in some examples, the device 200 may be configured to determine a rolling speed and/or a steering speed of a given based on the data provided by the rolling encoder 242 and/or the steering encoder 244.

Accordingly, in some examples, the propulsion system 204 may change a position of the device 200 based on control of the wheel modules 220, 222, 223, and 224. For example, the data provided by the plurality of encoders may be conditioned as inputs to a control loop (e.g., the control system 210) and outputs of the control loop may be conditioned as inputs to the plurality of motors to cause the motion of the device 200.

The power supply 206 may be configured to provide power to some or all of the components of the device 200. To this end, the power supply 206 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 206 may include a source of energy that powers some or all the components of the device 200. Example sources of energy may include gasoline, diesel, propane, other compressed gas-based fuels, ethanol, solar panels, batteries, or any other sources of energy. Further, for example, the power supply 206 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the device 200. Additionally or alternatively, the power supply 206 may include a combination of fuel tanks, batteries, capacitors, flywheels, etc.

The sensor system 208 may include a number of sensors configured to sense information about an environment in which the device 200 is located, as well as one or more actuators 258 configured to modify a position and/or orientation of the sensors. As shown, the sensors of the sensor system 208 include a Global Positioning System (GPS) 250, an inertial measurement unit (IMU) 252, a range unit 254, and a camera 256. The sensor system 208 may include additional sensors as well, including, for example, sensors that monitor internal systems of the device 200 (e.g., an $O_2$ monitor, a fuel gauge, a temperature monitor, etc.). Other sensors are possible as well.

The GPS 250 may be any sensor configured to estimate a geographic location of the device 200. To this end, the GPS 250 may include a transceiver configured to estimate a position of the device 200 with respect to the Earth. The GPS 250 may take other forms as well.

The IMU 252 may be any combination of sensors configured to sense position and orientation changes of the device 200 based on inertial acceleration. In some embodiments, the combination of sensors may include, for example, accelerometers and gyroscopes. Other combinations of sensors are possible as well.

The range unit 254 may be any sensor configured to sense objects in the environment in which the device 200 is located such as a RADAR (e.g., using radio signals), a LIDAR (e.g., using lasers), an Infrared range unit (e.g., using infrared), or any other range sensor. For example, the range unit 254 may include a light source and/or a light detector configured to emit light and detect reflections of the light. Further, in some examples, the range unit 254 may be configured to operate in a coherent (e.g., using heterodyne detection) or an incoherent detection mode. In some embodiments, in addition to sensing the objects, the range unit 254 may additionally be configured to sense the speed and/or heading of the objects.

The camera 256 may include any camera (e.g., a still camera, a video camera, etc.) configured to capture images of the environment in which the device 200 is located. To this end, the camera may take any of the forms described above or may take any other form. The sensor system 208 may additionally or alternatively include components other than those shown in FIG. 2.

The control system 210 may be configured to control operation of the device 200 and/or components thereof. To this end, the control system 210 may include a rolling unit 262 and a steering unit 264.

The rolling unit 262 may include any combination of mechanisms configured to adjust rolling motion of wheels (e.g., wheel 230, etc.) in the propulsion system 204. For example, the control system 210 may receive instructions to traverse the device 200 at a particular speed, and the control system 210 may control the fraction motor 232 to cause the wheel 230 to roll at the particular speed. In some examples, the rolling unit 262 may be implemented as a control loop that receives inputs from the rolling encoders (e.g., the rolling encoder 242) and provides output signals to control power provided to the traction motors (e.g., the traction motor 232) to achieve the particular speed of the wheels (e.g., the wheel 230). Example control loops may include open loops, closed loops, etc. For example, the rolling unit 262 may be implemented as proportional-integral-derivative (PID) controller. Other examples are possible as well.

The steering unit 264 may include any combination of mechanisms configured to adjust steering motion of wheels (e.g., wheel 230, etc.) in the propulsion system 204. Similarly to the rolling unit 262, for example, the steering unit 264 may be implemented as a control loop that receives inputs from steering encoder 244 and provides outputs to control power to the steering motor 234 to achieve a desired change in the steering angle of the wheel 230 at a particular speed. The control system 210 may additionally or alternatively include components other than those shown in FIG. 2.

Peripherals 212 may be configured to allow the device 200 to interact with external sensors, other devices, objects in the environment of the device 200, and/or a user, etc. To this end, the peripherals 212 may include, for example, a manipulator 270, a communication system 272, a touchscreen 274, a microphone 276, and/or a speaker 278.

The manipulator 270, for example, may include any manipulator such as a robotic arm, etc., configured to manipulate objects in the environment of the device 200. For example, the manipulator 270 may receive control signals to interact with objects in the environment of the device 200.

The communication system 272 may include a wired communication interface (e.g., parallel port, USB, etc.) and/or a wireless communication interface (e.g., antennae, transceivers, etc.) to receive and/or provide signals from/to external devices. In some examples, the communication system 272 may receive instructions for operation of the device 100. Additionally or alternatively, in some examples, the communication system 272 may provide output data such as data from the encoders 242, 244 and/or data from the sensor system 208.

The touchscreen 274 may be used by a user to input commands to the device 200. To this end, the touchscreen 274 may be configured to sense at least one of a position and a movement of a user's finger via capacitive sensing, resistance sensing, or a surface acoustic wave process, among other possibilities. The touchscreen 274 may be capable of sensing finger movement in a direction parallel or planar to the touchscreen surface, in a direction normal to the touchscreen surface, or both, and may also be capable of sensing a level of pressure applied to the touchscreen surface. The touchscreen 274 may be formed of one or more translucent or transparent insulating layers and one or more translucent or transparent conducting layers. The touchscreen 274 may take other forms as well. Further, in some examples, the touchscreen 274 may be configured as a display for providing output from various components of the device 200, such as the sensor system 208.

The microphone 276 may be configured to receive audio (e.g., a voice command or other audio input) from a user of the device 200. Similarly, the speakers 278 may be configured to output audio to the user of the device 200. The peripherals 212 may additionally or alternatively include components other than those shown in FIG. 2.

The computer system 214 includes one or more processors 280 and data storage 282. In some examples, some components of the computer system 214 may be distributed across multiple computing devices. For example, the data storage 282 may be included in an external data storage device communicatively linked with the device 200. Other examples are possible as well. However, for the sake of example, the components are shown and described as part of the computer system 214.

The computer system 214 may be configured to transmit data to and receive data from one or more of the propulsion system 204, the sensor system 208, the control system 210, and/or the peripherals 212. To this end, the computer system 214 may be communicatively linked to one or more of the propulsion system 204, the sensor system 208, the control system 210, and/or the peripherals 212 by a system bus, network, and/or other connection mechanism (not shown in FIG. 2).

The computer system 214 may be further configured to interact with and control one or more components of the propulsion system 204, the sensor system 208, the control system 210, and/or the peripherals 212. For example, the computer system 214 may be configured to provide instructions to the steering unit 264 to cause the steering motor 234 to adjust the steering angle (e.g., orientation, etc.) of the wheel 230. As another example, the computer system 214 may be configured to cause the camera 256 to capture images of the environment of the device 200. As yet another example, the computer system 214 may be configured to store and execute instructions for displaying visual information on the touchscreen 274. Other examples are possible as well.

The processor(s) 280 may comprise one or more general-purpose processors and/or one or more special-purpose processors. To the extent the processor 280 includes more than one processor, such processors may work separately or in combination. For example, a first processor of the processor(s) 280 may operate the propulsion system 204, and a second processor of the processor(s) 280 may operate the sensor system 208, etc. The data storage 282, in turn, may comprise one or more volatile and/or one or more non-volatile storage components, such as optical, magnetic, and/or organic storage, and the data storage 282 may be integrated in whole or in part with the processor 280.

In some embodiments, the data storage 282 may contain instructions 284 (e.g., program logic) executable by the processor 280 to perform various functions of the device 200. The data storage 282 may contain additional instructions as well, including instructions to transmit data to, receive data from, interact with, and/or control one or more of the propulsion system 204, the sensor system 208, the control system 210, the peripherals 212, and/or any other component of the device 200. Further, the data storage 282 may also store collected encoder data 286 that may include data provided by the plurality of encoders in the propulsion system 204 (e.g., rolling encoder 242, steering encoder 244, etc.). Therefore, in some examples, the processor 280 may execute the instructions 284 to analyze the stored encoder data 286 and determine information pertaining to the propulsion system 204. For example, the computer system 214 may determine possible orientations of the plurality of wheels (e.g., wheel 230, etc.) based on the stored encoder data 286 and the given arrangement of the plurality of wheels. Other examples are possible as well and are described in greater detail in exemplary embodiments of the present disclosure. Although not illustrated in FIG. 2, the data storage 282 may store other data such as data collected by the sensor system 208, and/or data from the control system 210, etc. The computer system 214 may additionally or alternatively include components other than those shown in FIG. 2.

In some embodiments, one or more of the propulsion system 204, the sensor system 208, the control system 210, and the peripherals 212 may be configured to work in an interconnected fashion with other components within and/or outside their respective systems. Further, the device 200 may include one or more elements in addition to or instead of those shown. For example, the device 200 may include one or more additional interfaces and/or power supplies. Other additional components are possible as well. In such embodiments, the data storage 282 may further include instructions (e.g., instructions 284, etc.) executable by the processor 280 to control and/or communicate with the additional components.

Still further, while each of the components and systems are shown to be integrated in the device 200, in some embodiments, one or more components or systems may be removably mounted to or otherwise connected (e.g., mechanically or electrically) to the device 200 using wired or wireless connections. The device 200 may take other forms as well.

Figure 3A:
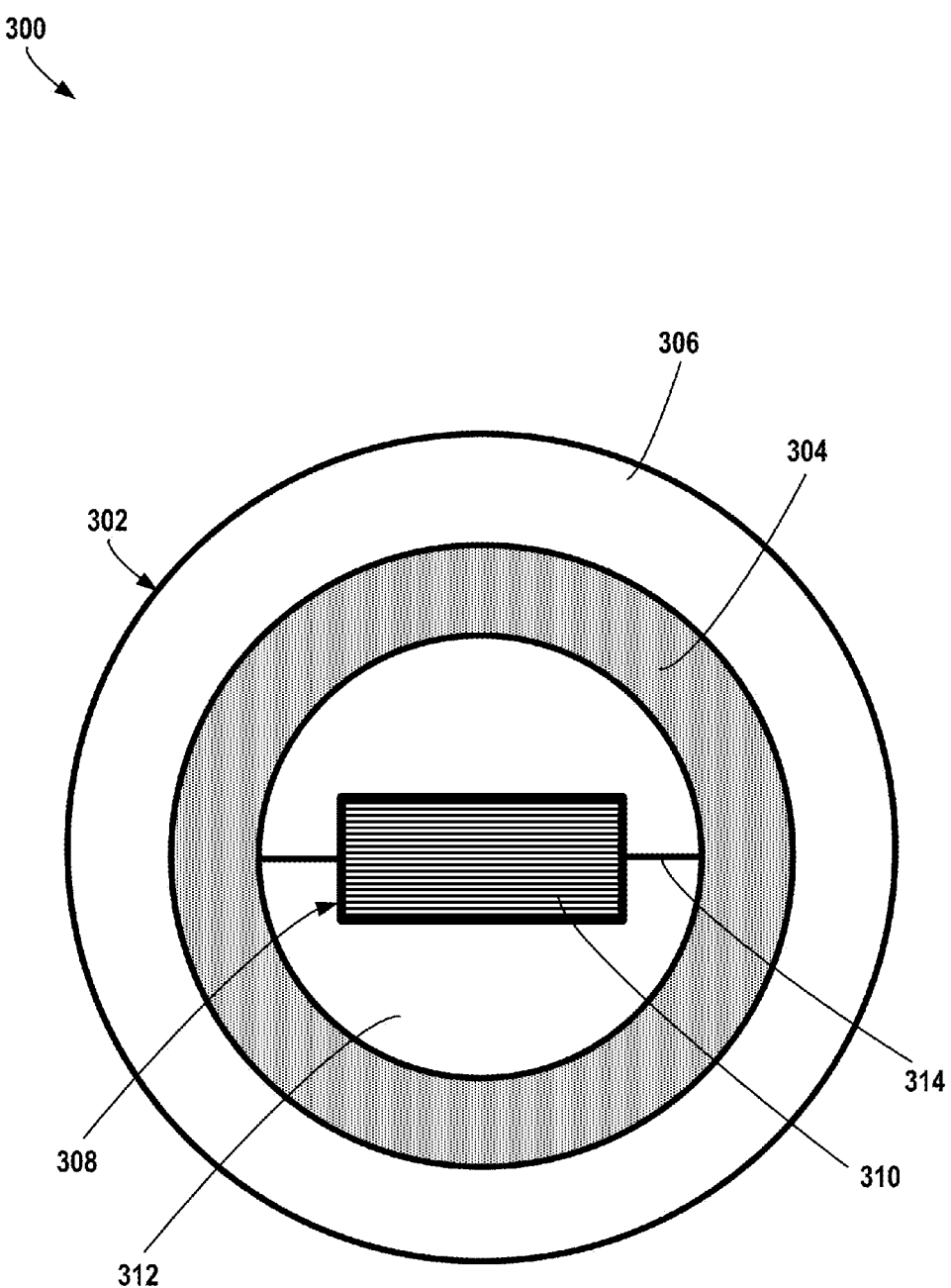
FIG. 3A is a top view of a motor system, according to an example embodiment.

FIG. 3A is a top view of a motor system 300, according to an example embodiment. As shown in FIG. 3A, the motor system 300 may include a steering motor 302 including a first rotor 304 positioned within a first stator 306. The steering motor 302 may be configured to rotate the first rotor 304 about a steering axis. The motor system 300 may further include a traction motor 308 including a second stator (not shown) position within a second rotor (not shown). The second rotor may include a traction surface defining a wheel 310, and the traction motor 308 may be configured to rotate the second rotor about a rolling axis. As shown in FIG. 3A, the fraction motor 308 may be positioned within an opening 312 in the first rotor 304. As shown in FIG. 3A, the first rotor 304 may be ring-shaped, such that the middle portion of the first rotor 304 does not have any material. As such, the opening 312 is defined by a cavity extending from a first end of the first rotor 304 to a second end of the first rotor 304. Such a configuration provides the opening 312, in which the traction motor 308 may be positioned. The motor system 300 may further include an axle 314 positioned coaxial to the second rotor and coupled to the first rotor 304. In this configuration, the traction motor 308 rotates about the steering axis as the steering motor 302 rotates the first rotor 304 about the steering axis. In operation, the traction motor 308 is configured to rotate the wheel 310 about a rolling axis to cause the wheel 310 (and corresponding AGV) to move forward/backward. Additionally, the steering motor 302 may be configured to rotate the first rotor 304 about a steering axis, and since the traction motor 308 is coupled to the first rotor 304 via the axle 314, the rotation of the first rotor 304 by the steering motor 302 translates to a rotation of the wheel 310 of the traction motor 308 to adjust an orientation (e.g., steering angle) of the wheel 310. Thus, the motor system 300 enables both steering and locomotion of an example AGV or other vehicle.

The first stator 306 may be coupled to a bottom surface of a frame of a device, such as frame 202 of device 200, for example. Further, the motor system 300 may include a first electrical slip ring configured to provide a first electrical connection between a power source and the first rotor 304. In addition, the motor system 300 may include a second electrical slip ring configured to provide a second electrical connection between the power source and the second rotor.

Figure 3B:
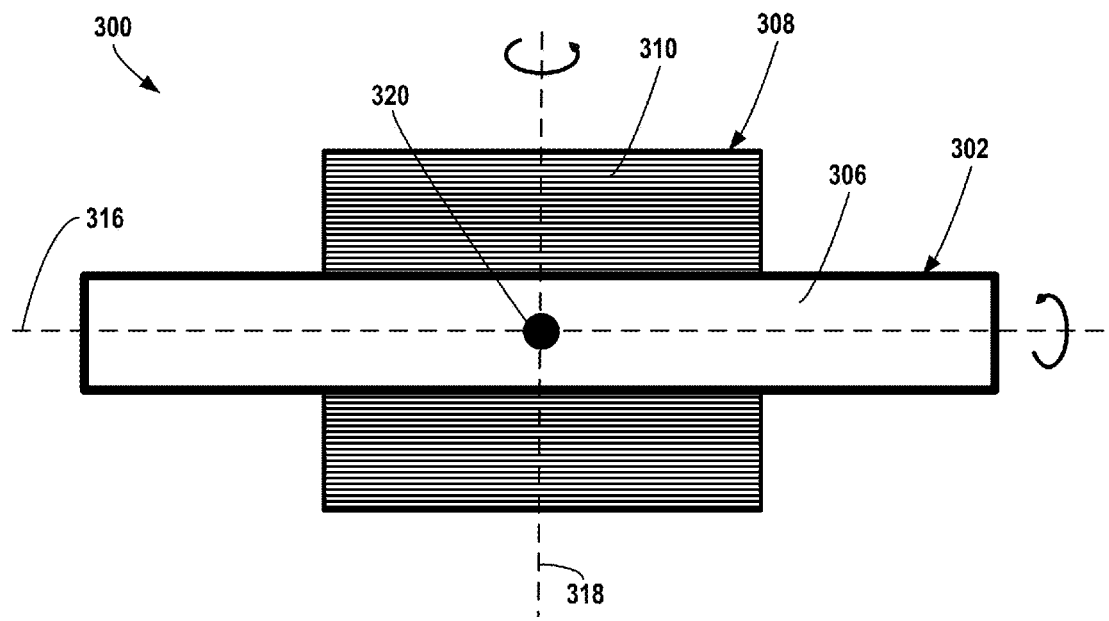
FIG. 3B is a side view of a motor system, according to an example embodiment.

FIG. 3B is a side view of the motor system 300, according to an example embodiment. As shown in FIG. 3B, in operation the wheel 310 may rotate about a rolling axis 316 to move the wheel 310 forward/backward. Further, for example, the steering motor 302 may be configured to rotate the first rotor 304 about a steering axis 318. As described above, the axle 314 may be configured such that the steering motor 302 causes the wheel 310 to rotate about the steering axis 318 to adjust a steering angle and/or orientation of the wheel 310. Further, as shown in FIG. 3B, the steering axis 318 is perpendicular to the rolling axis 316.

In the example shown in FIG. 3B, the steering axis 318 and the rolling axis 320 intersect at a center 320 of the first rotor 304. The first rotor 304 is positioned inside of the first stator 306, which is why the first rotor 304 is not seen from the side view shown in FIG. 3B. In such an example, the wheel 310 of the motor system 300 includes two degrees-of-freedom: the rolling axis 316 to move the wheel 310 forward/backward, and the steering axis 318 to adjust a steering angle and/or orientation of the wheel 310. As such, the wheel 310 shown in FIG. 3B is not holonomic. However, the motor system 300 is more compact in such a configuration, and complexity of the motor system 300 is reduced.

Figure 3C:
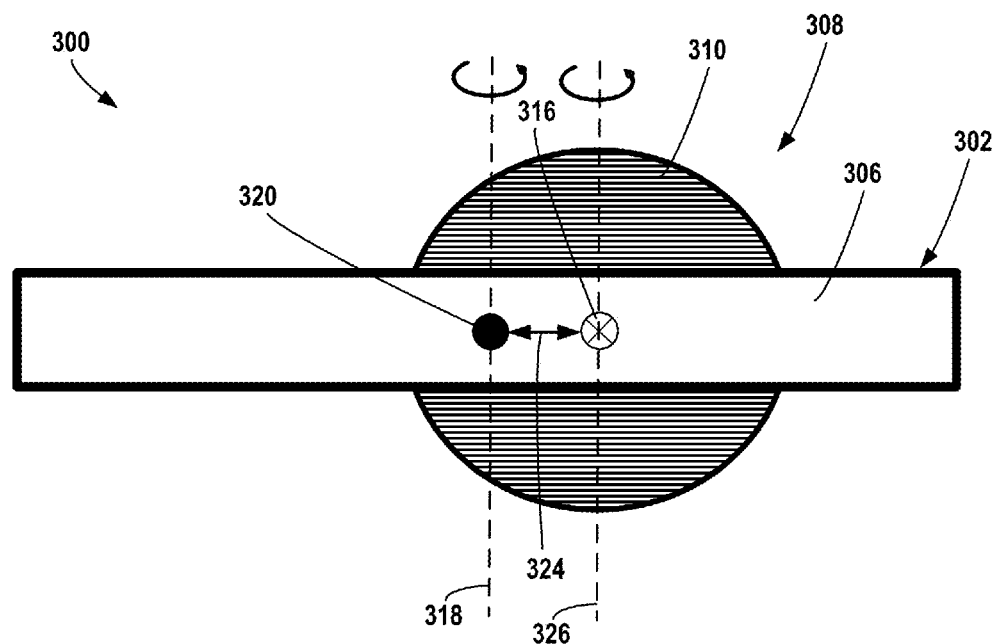
FIG. 3C is a side view of another motor system, according to an example embodiment.

FIG. 3C is a side view of the motor system 300, according to another example embodiment. The view shown in FIG. 3C is rotated 90 degrees from the view shown in FIG. 3B. As shown in FIG. 3C, the steering axis 318 and the rolling axis 316 are skewed and do not intersect such that the steering axis 318 is separated from the rolling axis 316 by an offset distance 324. In such an example, the wheel 310 of the motor system 300 includes three degrees-of-freedom: the rolling axis 316 to move the wheel 310 forward/backward, the steering axis 318 to adjust a steering angle and/or orientation of the wheel 310, and a twist axis 326 that is offset from the steering axis 318. As such, the wheel 310 shown in FIG. 3C is holonomic. As such, the wheel 310 can turn in any direction instantaneously. However, the motor system 300 shown in FIG. 3C is less compact than the example shown in FIG. 3B, and complexity of the motor system 300 is increased. The motor system 300 illustrated in FIGS. 3B and 3C show the steering motor 302 positioned at a midline of the traction motor 308. However, in examples the steering motor 302 may be positioned at an offset distance from the midline of the traction motor 308. In addition, as shown in FIGS. 3B and 3C, the height of the motor system 300 does not exceed the height of the wheel 310. As such, the motor system 300 has a low vertical profile which may be advantageous in various embodiments where space is a concern. For example, motor system 300 may be used in a pallet jack with steerable forks. Other examples are possible as well.

Figure 3D:
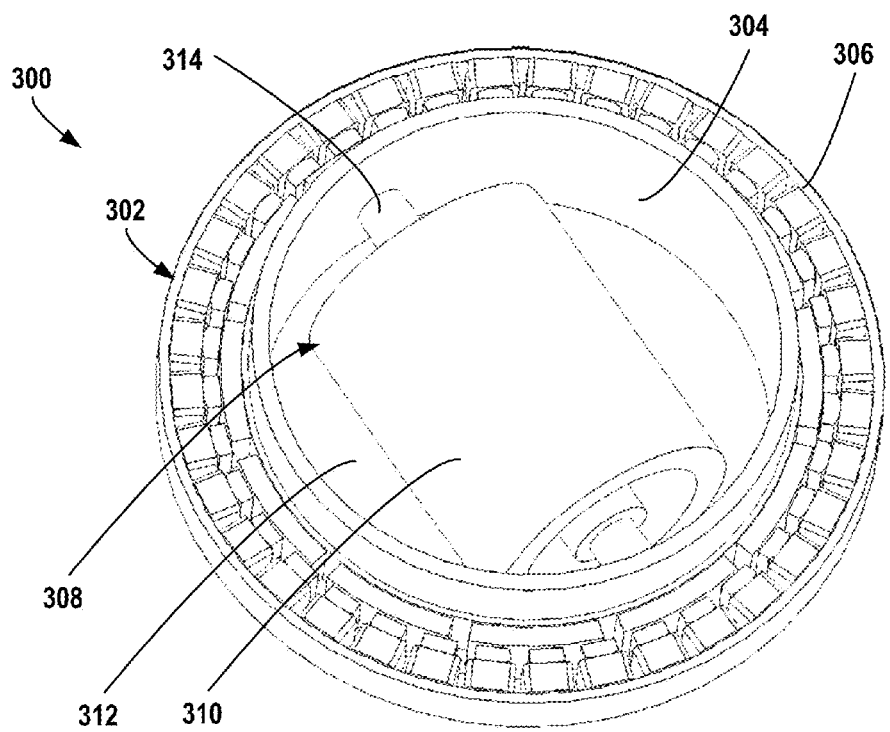
FIG. 3D is an isometric view of a motor system, according to an example embodiment.
Figure 3E:
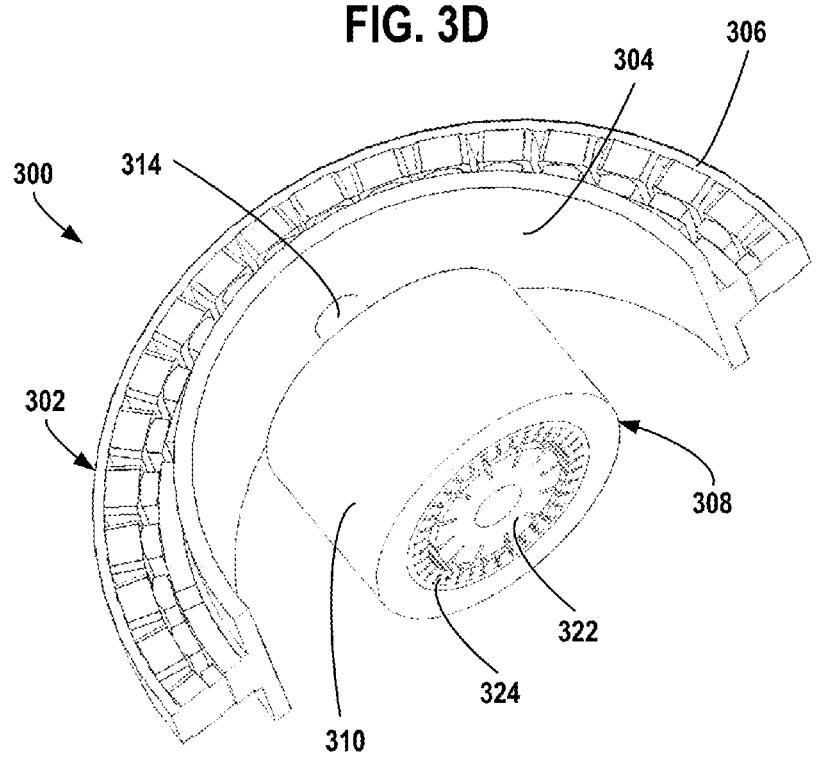
FIG. 3E is a cross-section view of a motor system, according to an example embodiment.

FIG. 3D is an isometric view of the motor system 300, according to an example embodiment. As shown in FIG. 3D, the motor system 300 may include a steering motor 302 including a first rotor 304 positioned within a first stator 306. The steering motor 302 may be configured to rotate the first rotor 304 about a steering axis. As illustrated in the cross-section view of the motor system 300 shown in FIG. 3E, the motor system 300 may further include a traction motor 308 including a second stator 322 position within a second rotor 324. The second rotor 324 may include a traction surface defining a wheel 310, and the traction motor 308 may be configured to rotate the second rotor 324 about a rolling axis. As shown in FIGS. 3D and 3E, the traction motor 308 may be positioned within an opening 312 in the first rotor 304. As shown in FIGS. 3D and 3E, the first rotor 304 may be ring-shaped, such that the middle portion of the first rotor 304 does not have any material. As such, the opening 312 is defined by a cavity extending from a first end of the first rotor 304 to a second end of the first rotor 304. Such a configuration provides the opening 312, in which the traction motor 308 may be positioned. The motor system 300 may further include an axle 314 positioned coaxial to the second rotor and coupled to the first rotor 304. In this configuration, the traction motor 308 rotates about the steering axis as the steering motor 302 rotates the first rotor 304 about the steering axis. In operation, the traction motor 308 is configured to rotate the wheel 310 about a rolling axis to cause the wheel 310 (and corresponding AGV) to move forward/backward. Additionally, the steering motor 302 may be configured to rotate the first rotor 304 about a steering axis, and since the traction motor 308 is coupled to the first rotor 304 via the axle 314, the rotation of the first rotor 304 by the steering motor 302 translates to a rotation of the wheel 310 of the traction motor 308 to adjust an orientation (e.g., steering angle) of the wheel 310. Thus, the motor system 300 enables both steering and locomotion of an example AGV or other vehicle.

Figure 3F:
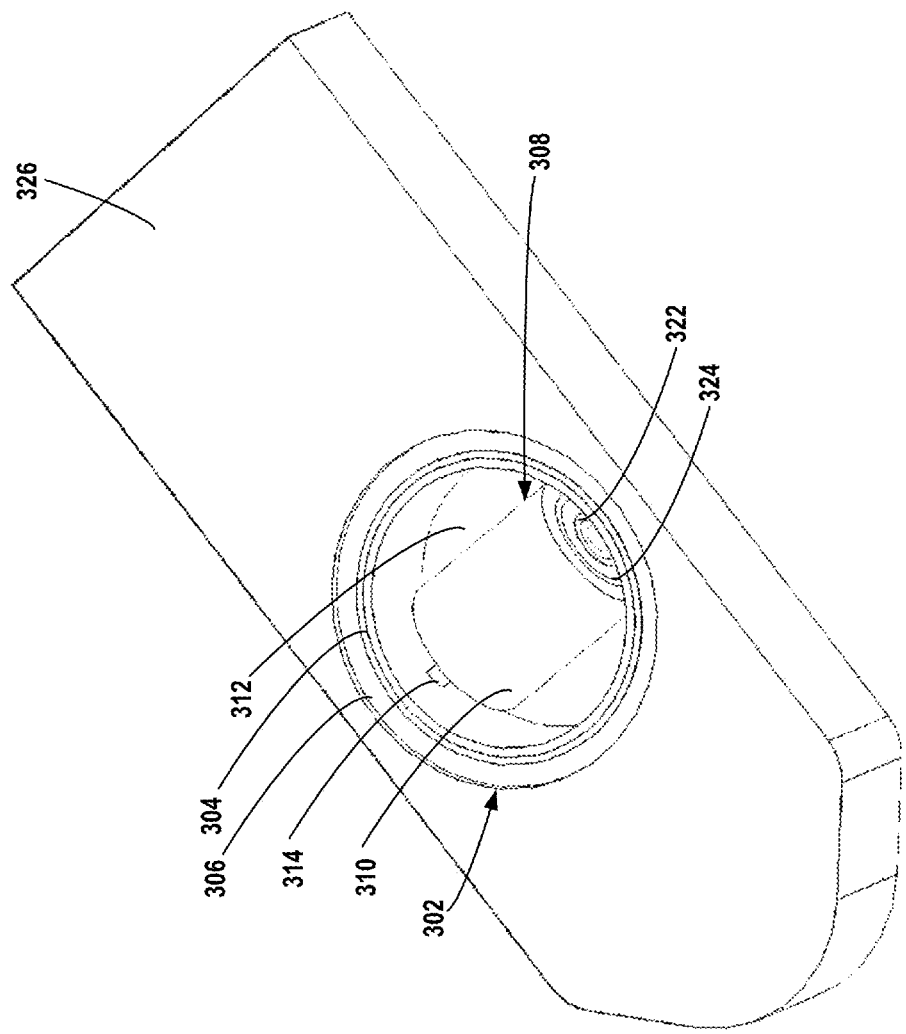
FIG. 3F is an isometric view of a steerable fork with a motor system, according to an example embodiment.

FIG. 3F is an isometric view of a steerable fork with a motor system, according to an example embodiment. As described above, the first stator 306 may be coupled to a frame of a device. In the example shown in FIG. 3F, the first stator 306 is coupled to a fork 326 of a pallet jack. The motor system 300 may thus be used for both steering and locomotion of the pallet jack. Other example embodiments are possible as well.

Figure 4:
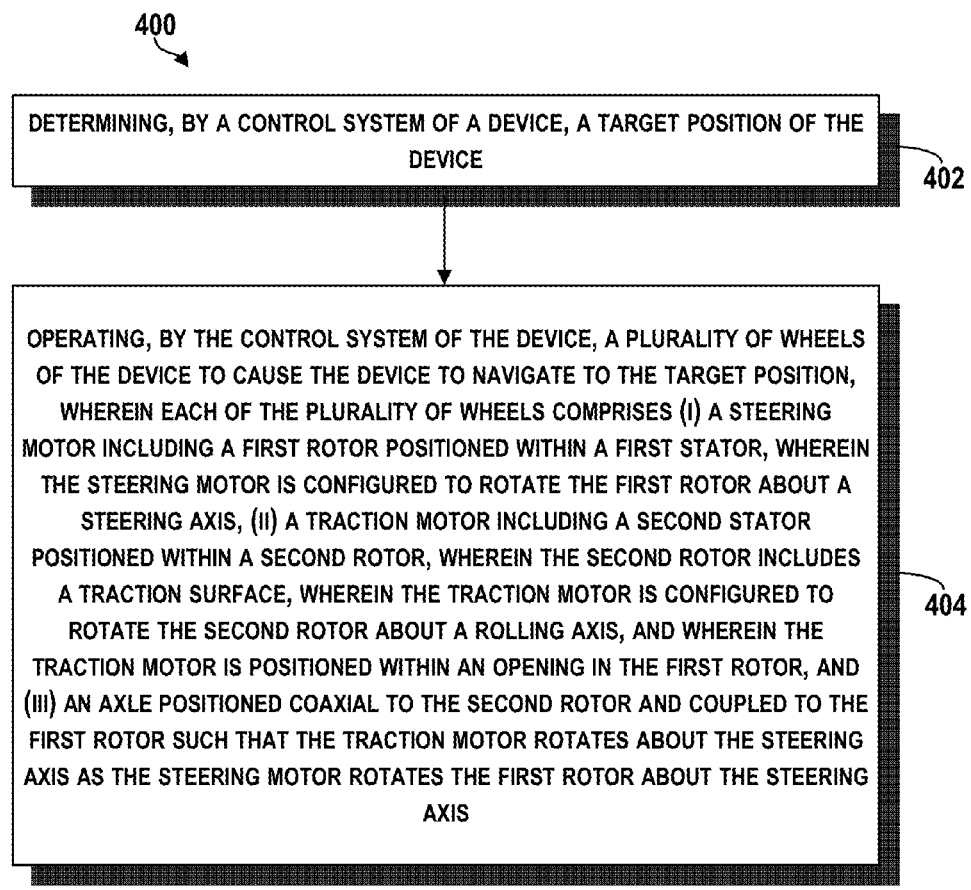
FIG. 4 is a block diagram of a method, according to an example embodiment.

FIG. 4 is a block diagram of a method 400, according to an example embodiment. Method 400 shown in FIG. 4 presents an embodiment of a method that could be used with the device 200 and/or motor system 300, for example. Method 400 may include one or more operations, functions, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

At block 402, the method 400 includes determining, by a control system of a device, a target position of the device. In one example, the target position may coincide with an object in an environment of the device. Within examples, an example device is a mechanically operable mobile device with at least some functions automated by a control system of the device. As a specific example, the device may be an AGV. Such an AGV may be a relatively small, mobile robotic device that is capable of transporting individual boxes or cases. The AGV may include wheels to allow for locomotion within a warehouse environment. Additionally, a top surface of the AGV may be used to places boxes or other objects for transport. In some examples, the top surface may include rotating conveyors to move objects to or from the AGV. In additional examples, the AGV may be powered by one or more batteries that can be quickly recharged at a battery charging station and/or exchanged for fresh batteries at a battery exchange station. In further examples, the AGV may additionally include other components not specifically identified here, such as sensors for navigation. AGVs with different shapes and sizes also may be included within a robotic warehouse fleet, possibly depending on the types of packages handled by a warehouse.

In one example, determining the target position of the device may include the device receiving instructions to pick up an object at the target position. Within examples, instructions to pick up an object include any type of digital signal or information that is receivable by the control system of the device. In some examples, the instructions may simply include a signal to pick up an object without other information identifying the object. In such examples, the control system of the device may infer which object to pick up or otherwise identify the object based on the current positioning of the device. The control system may also use predetermined guidelines regarding types of objects to be picked up. For instance, an AGV may have predetermined guidelines to only pick up and move boxes. In other examples, the instructions may include information to help the control system identify the object to be picked up as well. For instance, the instructions may include the type of object (e.g., a box), a location of the object, or other types of identifying information (e.g., shape, size, color, identification numbers, etc.). In further examples, the instructions may also information indicating how to pick up the object. For instance, the instructions may indicate a pickup point and/or which side of the object to use to place the object on the top surface of the AGV.

In some examples, the target position of the device may be received from a remote operator computing device which sends a digital signal to the control system of the device. For instance, the remote operator computing device may include a graphical user interface with a selectable option (e.g., a button or menu item) to relinquish control of the device to the local automated system to complete pickup of an object. In some examples, the user interface may also enable communication of other types of information to include in the instructions, such as identification of the object (e.g., by clicking or selecting the object on a screen) and/or what point on the object to use as a pickup point.

In further examples, the target position of the device may instead be received from a remote automated system. For instance, the instructions could be received from a global control system of a robotic warehouse fleet, such as global control system 150 as described in reference to FIG. 1B. In such examples, the global control system may control the device to navigate close to an object (e.g., using a global map of the environment) to be picked up before transferring control to the control system for automated final device approach and object pickup.

At block 404, the method 400 includes operating, by the control system of the device, a plurality of wheels of the device to cause the device to navigate to the target position. Each of the plurality of wheels may be configured similar to the motor system 300 described above in relation to FIGS. 3A-3C. As such, each of the plurality of wheels may include a steering motor including a first rotor positioned within a first stator. The steering motor may be configured to rotate the first rotor about a steering axis. Further, each of the plurality of wheels may include a traction motor including a second stator positioned within a second rotor. The second rotor may include a traction surface, and the traction motor may be configured to rotate the second rotor about a rolling axis. The traction motor is positioned within an opening in the first rotor. Further still, each of the plurality of wheels may include an axle positioned coaxial to the second rotor and coupled to the first rotor such that the traction motor rotates about the steering axis as the steering motor rotates the first rotor about the steering axis.

In addition, method 400 may further include receiving, by the device from a first encoder coupled to the steering motor, data indicative of motion and orientation of the steering axis of a given wheel. The method 400 may further include receiving, by the device from a second encoder coupled to the traction motor, data indicative of motion of the rolling axis of the given wheel, wherein operating the plurality of wheels of the device to cause the device to navigate to the target position is based on the data received from the encoder. In one example, a rolling encoder may be coupled to the traction motor and configured to provide data indicative of motion and/or orientation of the traction motor.

Similarly, a steering encoder may be coupled to the steering motor and configured to provide data indicative of motion and/or orientation of the steering motor. In these examples, the rolling encoder and/or the steering encoder may provide the data indicative of the orientations of the traction motor and/or the steering motor without the device rotating a given wheel until the signal (e.g., index pulse) is received from the rolling encoder and/or the steering encoder. Moreover, in some examples, the device may be configured to determine a rolling speed and/or a steering speed of a given based on the data provided by the rolling encoder and/or the steering encoder.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A motor system comprising:
   a steering motor including a first rotor positioned within a first stator, wherein the steering motor is configured to rotate the first rotor about a steering axis;
   a traction motor including a second stator positioned within a second rotor, wherein the second rotor includes a traction surface defining a wheel, wherein the traction motor is configured to rotate the second rotor about a rolling axis, and wherein the traction motor is positioned within an opening in the first rotor; and
   an axle positioned coaxial to the second rotor and coupled to the first rotor such that the traction motor rotates about the steering axis as the steering motor rotates the first rotor about the steering axis.

2. The motor system of claim 1, further comprising:
   a first encoder coupled to the steering motor to provide data indicative of motion and orientation of the steering axis;
   a second encoder coupled to the traction motor to provide data indicative of motion of the rolling axis; and
   a controller configured to identify the motion of the steering axis and the motion of the rolling axis based on the data provided by the first encoder and the data provided by the second encoder.

3. The motor system of claim 2, wherein the first encoder is configured to provide a first signal indicative of the steering motor being at a first orientation, wherein the second encoder is configured to provide a second signal indicative of the traction motor being at a second orientation, wherein the controller is configured to cause the steering motor to rotate the wheel until the first encoder provides the first signal, and wherein the controller is configured to cause the traction motor to rotate the wheel until the second encoder provides the second signal.

4. The motor system of claim 2, wherein the controller is configured to determine, based on the data from the first encoder, a first speed of the steering motor responsive to the controller causing the steering motor to rotate the wheel, wherein the controller is configured to determine, based on the data from the second encoder, a second speed of the traction motor responsive to the controller causing the traction motor to rotate the wheel, and wherein the controller is configured to identify the motion of the steering axis and the motion of the rolling axis of the wheel based also on the determined speeds.

5. The motor system of claim 1, wherein the steering axis is perpendicular to the rolling axis.

6. The motor system of claim 1, wherein the steering axis and the rolling axis intersect at a center of the first rotor.

7. The motor system of claim 1, wherein the steering axis and the rolling axis are skewed and do not intersect such that the steering axis is separated from the rolling axis by an offset distance.

8. The motor system of claim 1, further comprising a first electrical slip ring configured to provide a first electrical connection between a power source and the first rotor, and a second electrical slip ring configured to provide a second electrical connection between the power source and the second rotor.

9. The method of claim 1, wherein the steering motor is positioned at a midline of the fraction motor.

10. The method of claim 1, wherein a height of the motor system does not exceed a height of the wheel.

11. A device comprising:
a frame including a top surface and a bottom surface;
a plurality of wheels coupled to the bottom surface of the frame, wherein each of the plurality of wheels comprise:
  a steering motor including a first rotor positioned within a first stator, wherein the steering motor is configured to rotate the first rotor about a steering axis, and wherein the first stator is coupled to the bottom surface of the frame;
  a traction motor including a second stator positioned within a second rotor, wherein the second rotor includes a traction surface, wherein the traction motor is configured to rotate the second rotor about a rolling axis, and wherein the traction motor is positioned within an opening in the first rotor; and
  an axle positioned coaxial to the second rotor and coupled to the first rotor such that the traction motor rotates about the steering axis as the steering motor rotates the first rotor about the steering axis; and
a controller configured to operate the steering motor and the traction motor of each of the plurality of wheels in order to cause the device to navigate within an environment.

12. The device of claim 11, further comprising:
a first encoder coupled to the steering motor to provide data indicative of motion and orientation of the steering axis;
a second encoder coupled to the traction motor to provide data indicative of motion of the rolling axis; and
a controller configured to identify the motion of the steering axis and the motion of the rolling axis based on the data provided by the first encoder and the data provided by the second encoder.

13. The device of claim 12, wherein the first encoder is configured to provide a first signal indicative of the steering motor being at a first orientation, wherein the second encoder is configured to provide a second signal indicative of the traction motor being at a second orientation, wherein the controller is configured to cause the steering motor to rotate the wheel until the first encoder provides the first signal, and wherein the controller is configured to cause the fraction motor to rotate the wheel until the second encoder provides the second signal.

14. The device of claim 12, wherein the controller is configured to determine, based on the data from the first encoder, a first speed of the steering motor responsive to the controller causing the steering motor to rotate the wheel, wherein the controller is configured to determine, based on the data from the second encoder, a second speed of the traction motor responsive to the controller causing the traction motor to rotate the wheel, and wherein the controller is configured to identify the motion of the steering axis and the motion of the rolling axis of the wheel based also on the determined speeds.

15. The device claim 11, wherein the steering axis of a given wheel of the plurality of wheels is perpendicular to the rolling axis of the given wheel of the plurality of wheels.

16. The device of claim 11, wherein the plurality of wheels comprises four wheels.

17. A method comprising:
determining, by a control system of a device, a target position of the device;
operating, by the control system of the device, a plurality of wheels of the device to cause the device to navigate to the target position, wherein each of the plurality of wheels comprises:
  a steering motor including a first rotor positioned within a first stator, wherein the steering motor is configured to rotate the first rotor about a steering axis;
  a traction motor including a second stator positioned within a second rotor, wherein the second rotor includes a traction surface, wherein the traction motor is configured to rotate the second rotor about a rolling axis, and wherein the traction motor is positioned within an opening in the first rotor; and
  an axle positioned coaxial to the second rotor and coupled to the first rotor such that the traction motor rotates about the steering axis as the steering motor rotates the first rotor about the steering axis.

18. The method of claim 17, further comprising:
receiving, by the device from a first encoder coupled to the steering motor, data indicative of motion and orientation of the steering axis of a given wheel; and
receiving, by the device from a second encoder coupled to the fraction motor, data indicative of motion of the rolling axis of the given wheel, wherein operating the plurality of wheels of the device to cause the device to navigate to the target position is based on the data received from the first encoder and the data received from the second encoder.

19. The method of claim 17, wherein the steering axis is perpendicular to the rolling axis.

20. The method of claim 17, wherein the steering axis and the rolling axis are skewed and do not intersect such that the steering axis is separated from the rolling axis by an offset distance.

* * * * *